(12) United States Patent
Hatte (10) Patent No.: US 8,429,306 B2
(45) Date of Patent: *Apr. 23, 2013

(54) SYSTEMS AND METHODS FOR AUTOMATIC ASSIGNMENT OF IDENTIFICATION CODES TO DEVICES

(75) Inventor: François Hatte, St Louis Park, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/823,046

(22) Filed: Jun. 25, 2007

(65) Prior Publication Data

US 2007/0255858 A1  Nov. 1, 2007

Related U.S. Application Data

(63) Continuation of application No. 10/308,258, filed on Dec. 2, 2002, now Pat. No. 7,237,041.

(51) Int. Cl.
*G06F 3/00* (2006.01)

(52) U.S. Cl.
USPC ............................................................. 710/3

(58) Field of Classification Search .................. None
See application file for complete search history.

(56) References Cited

U.S. PATENT DOCUMENTS

| | | | |
|---|---|---|---|
| 5,414,859 A | 5/1995 | Staudacher et al. | |
| 5,421,019 A | 5/1995 | Holsztynski et al. | |
| 6,085,307 A | 7/2000 | Evoy et al. | |
| 6,157,395 A * | 12/2000 | Alcorn | 345/506 |
| 6,574,725 B1 * | 6/2003 | Kranich et al. | 712/31 |
| 6,854,053 B2 | 2/2005 | Burkhardt et al. | |

FOREIGN PATENT DOCUMENTS

EP  1 128 275 A2  8/2001

OTHER PUBLICATIONS

Blum, C., "Serial Communication Using RS-232," http://www.geocities.com/SiliconValley/Peaks/3938/1656.htm, 15 pages (Last Updated Sep. 25, 2002).
16B0301B2 DCREG Interface via MODBUS-RTU Operation Manual, *Elettronica Santerno S.p.A.*, Version D3.06, pp. 1-15 (Jun. 6, 2001).
Microsoft Corporation, Microsoft Computer Dictionary, 2002, Microsoft Press, Fifth Edition.
Christopher Strangio, The RS-232 Standard, 1993, CAMI Research Inc., Pin Assignments www.camiresearch.com/Data_Com_Basics/RS232standard.html#anchor1155222.
International Search Report Mailed Mar. 9, 2005; International Application No. PCT/US 03/37970; International Filing Date: Nov. 25, 2003.

\* cited by examiner

*Primary Examiner* — Henry Tsai
*Assistant Examiner* — Aurangzeb Hassan
(74) *Attorney, Agent, or Firm* — Merchant & Gould P.C.

(57) ABSTRACT

A system and method for automatically and uniquely assigning identification codes to a plurality of slave processors. A master processor having communication port is linked to a first slave processor, which, itself, has first and second communication ports. The first communication port is used in support of the aforementioned link to the computer. A second slave processor, also having first and second serial ports, is linked by its first communication port to the second communication port of the first slave processor. The slave processors are programmed to read designated pins on their first communication ports. The read values determine the identification code of each processor. Thereafter, each slave processor outputs to its second port a value one greater than the value read from its first port. Therefore, each slave processor assigns itself a particular identification code and directs the next slave processor to assign itself an identification code one greater.

21 Claims, 9 Drawing Sheets

SYSTEMS AND METHODS FOR AUTOMATIC ASSIGNMENT OF IDENTIFICATION CODES TO DEVICES

CROSS REFERENCE TO RELATED APPLICATION

This application is a continuation of application Ser. No. 10/308,258, filed Dec. 2, 2002, now U.S. Pat. No. 7,237,041 which application is incorporated herein by reference.

FIELD OF THE INVENTION

The invention relates generally to a communication scheme for a master processor and a plurality of slave processors and more particularly to a scheme for automatically assigning a unique identification code to each of a plurality of devices connected to a serial multidrop link.

BACKGROUND OF THE INVENTION

Digital system architectures commonly include a master processor that delivers commands to a multiplicity of slave processors. In such architectures, the master processor typically takes charge of the slave processors by delivering high-level commands to those processors. The slave processors typically enact lower-level control over a system or environment. For example, in the context of communication equipment, a computer (master processor) may be used to communicate with a plurality of central processing unit (CPU) cards or other devices (slave processors). The cards or other devices may be held in a chassis or other frame or panel. A chassis is a structural unit of functional cards or other devices, including a CPU card and a plurality of other cards, such as a media converter card, an alarm card, etc. A CPU card is used to control the other cards in a chassis.

To enable the computer to command the plurality of CPU cards, a variety of communication schemes may be employed. According to one such scheme, the computer may be connected to a first CPU card by a set of serial data communication lines. The first CPU card is, in turn, connected to a second CPU card by a set of serial data communication lines. Each of the serial data communication lines connecting the computer to the first CPU card is directly coupled to a corresponding serial data line connecting the second CPU card to the first CPU card. Thus, both the first and second CPU cards effectively share a common set of serial data communication lines with the computer. Accordingly, a transmission from the computer is received by both the first and second CPU cards. If the computer is to exert control over a third CPU card, the third CPU card would be attached via a set of serial data lines to the second CPU card, so that the first, second, and third CPU cards effectively share a common set of serial data communication lines with the computer. A fourth CPU card would be attached to the third CPU card, and so on. This sort of scheme is referred to as either a serial multidrop communication link or a daisy chain.

One shortcoming of the above-described scheme is that because each CPU card receives every transmission emanating from the computer, each CPU card will respond to the computer's commands, unless the computer identifies which CPU card a particular instruction is intended for. Therefore, an identification code is typically assigned to each CPU card. The computer addresses a particular CPU card by transmitting a command coupled with an identification code pointing out which CPU card the command was intended for. All other CPU cards ignore the command.

Heretofore, the process of assigning an identification code to a particular CPU has been cumbersome and subject to error. To assign an identification code to a CPU, a set of dip switches must be manually manipulated. The position of the dip switches determines the identification code. Manual manipulation of dip switches is time consuming and therefore undesirable. Further, manual manipulation of dip switches leaves open the possibility of redundant assignment of identification codes, in which case more than one CPU would respond to a particular command. Such an eventuality could lead to data collisions and other undesirable phenomena on the serial link.

As is evident from the foregoing discussion, there exists an unmet need for a scheme by which unique identification codes can be assigned to slave processors. A favorable scheme will require little or no human effort and will ensure that redundant identification code assignment does not occur.

SUMMARY OF THE INVENTION

A system for automatic assignment of identification numbers to each of a plurality of slave processors may include a master processor coupled to an input/output (I/O) port. The system may further include a first slave processor coupled to first and second I/O ports, and a second slave processor coupled to first and second I/O ports. The I/O port of the master processor may be coupled to the first I/O port of the first slave processor. The second I/O port of the first slave processor may be coupled to the first I/O port of the second slave processor. A plurality of lines in the first I/O port of the first slave processor may be directly linked to corresponding lines in the second I/O port of the first slave processor, so that a signal transmitted along the linked lines is received by the first and second slave processors. A plurality of lines in the first I/O port of the first slave processor may not be directly linked to lines in the second I/O port of the first slave processor. The first slave processor may be programmed to receive a digital signal held on the unlinked lines of its first I/O port, and based thereupon, to generate a digital signal on the unlinked lines of the second I/O port. The first slave processor may also be programmed to assign itself an identification code based upon the digital signal held on the unlinked lines of its first I/O port. Thereafter the first slave processor responds to commands on the linked lines of its first I/O port only if the commands are associated with the identification code the first slave processor assigned to itself.

According to another embodiment of the present invention, a unit of data communication equipment may be designed to cooperate in uniquely assigning itself an identification code, by including a processor coupled to first and second I/O ports. The unit may also include a memory unit operably coupled to the processor. A plurality of lines in the first I/O port may be directly linked to corresponding lines in the second I/O port. A plurality of lines in the first I/O port may not be directly linked to lines in the second I/O port. The memory unit may store a set of instructions for receiving a digital signal held on the unlinked lines of the first I/O port, and based thereupon, to generate a digital signal on the unlinked lines of the second I/O port. The memory unit may also store a set of instructions for assigning to the DCE an identification code based upon the digital signal held on the unlinked lines of the first I/O port, and for thereafter responding to commands on the linked lines of the first I/O port only if the commands are associated with the identification code assigned to the DCE.

According to yet another embodiment of the present invention, a method for assigning a unique identification code to a first and second slave processor may be arrived at and employed in the following environment. The first slave processor and a master processor share a private set of communication lines. Similarly, the second and first slave processor share a private set of communication lines. Additionally, the master processor and first and second slave processors share a common set of communication lines. The method involves the following acts. The first slave processor receives a signal carried on the private lines connecting the first slave processor and the master processor. The first slave processor assigns itself an identification code based upon the signal held on the private lines connecting the first slave processor and the master processor, so that the first slave processor thereafter responds to commands on the common lines only if the commands are associated with the identification code assigned to the first slave processor. The first slave processor transmits to the second slave processor a signal carried on the private lines connecting the first and second slave processors. The second slave processor assigns itself an identification code based upon the signal held on the private lines connecting the first and second slave processors, so that the second slave processor thereafter responds to commands on the common lines only if the commands are associated with the identification code assigned to the second slave processor.

According to yet another embodiment of the present invention, a computerized system that automatically assigns an identification code to each of a plurality of slave processors in communication with a master processor may include a master processor coupled to an input/output (I/O) port. The system may also include a first slave processor coupled to first and second I/O ports. Further, the system may include a second slave processor coupled to first and second I/O ports. Finally, the system may include a means for automatically and uniquely assigning an identification number to each of the first and second slave processors.

DETAILED DESCRIPTION

A system for automatically and uniquely assigning identification codes to a plurality of slave processors may be arrived at by implementation of the following scheme. A computer is used as a master processor. The computer includes a serial data communication port. The computer is linked to a first slave processor, which, itself, has first and second serial ports (the first serial port is used in support of the aforementioned link to the computer). A second slave processor, also having first and second serial ports, is linked to the first slave processor (the first serial port of the second slave processor is linked to the second serial port of the first slave processor). A third slave processor may be linked to the second serial port of the second slave processor, and so on.

The slave processors are programmed to perform the following steps after performance of their boot-up routines, which may be initiated in sequence for each slave processor (i.e., the second slave processor may be booted up after the first slave processor is booted, and so on). Each slave processor reads designated pins on its first serial port. The values read therefrom determine the identification code assigned to the processor. Thereafter, each slave processor outputs to its second serial port a value based upon the value read from its first serial port. For example, a slave processor may output to its second serial port a value one greater than the value read from its first serial port. Thus, by virtue of the above-described scheme, each slave processor assigns itself a particular identification code and directs the next slave processor to assign itself an identification code different than the one assigned to itself (such as one greater than the one assigned to itself).

Figure 1:
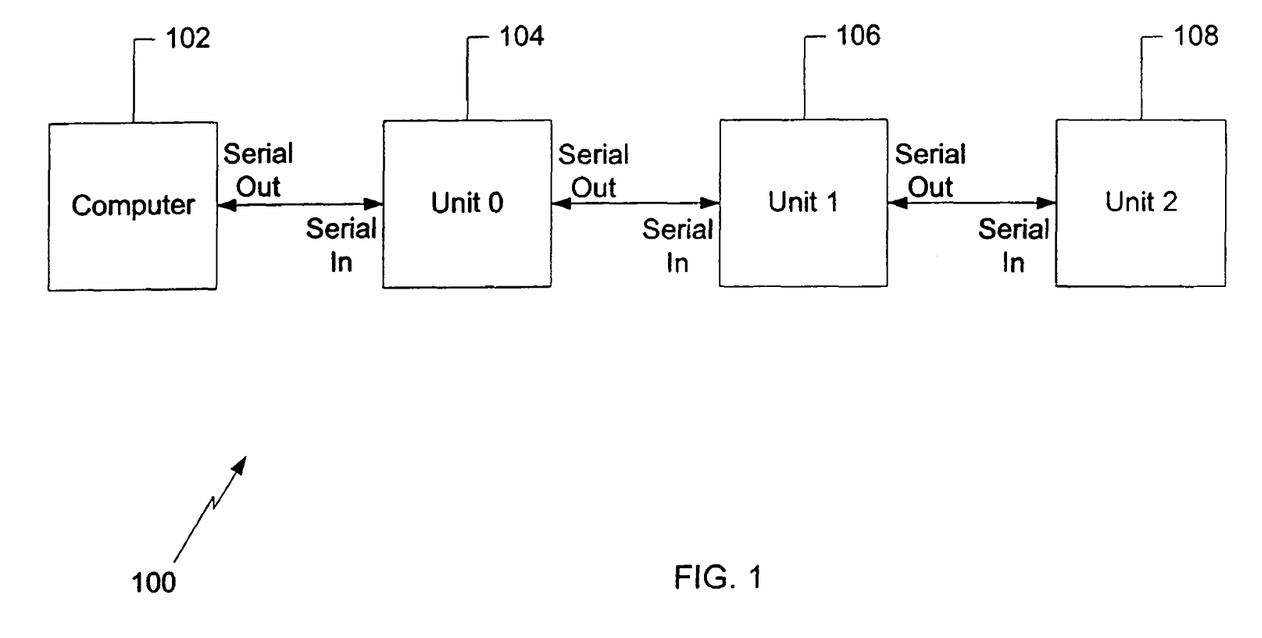
FIG. 1 depicts a master/slave processing system, in accordance with one embodiment of the present invention.
Figure 2A:
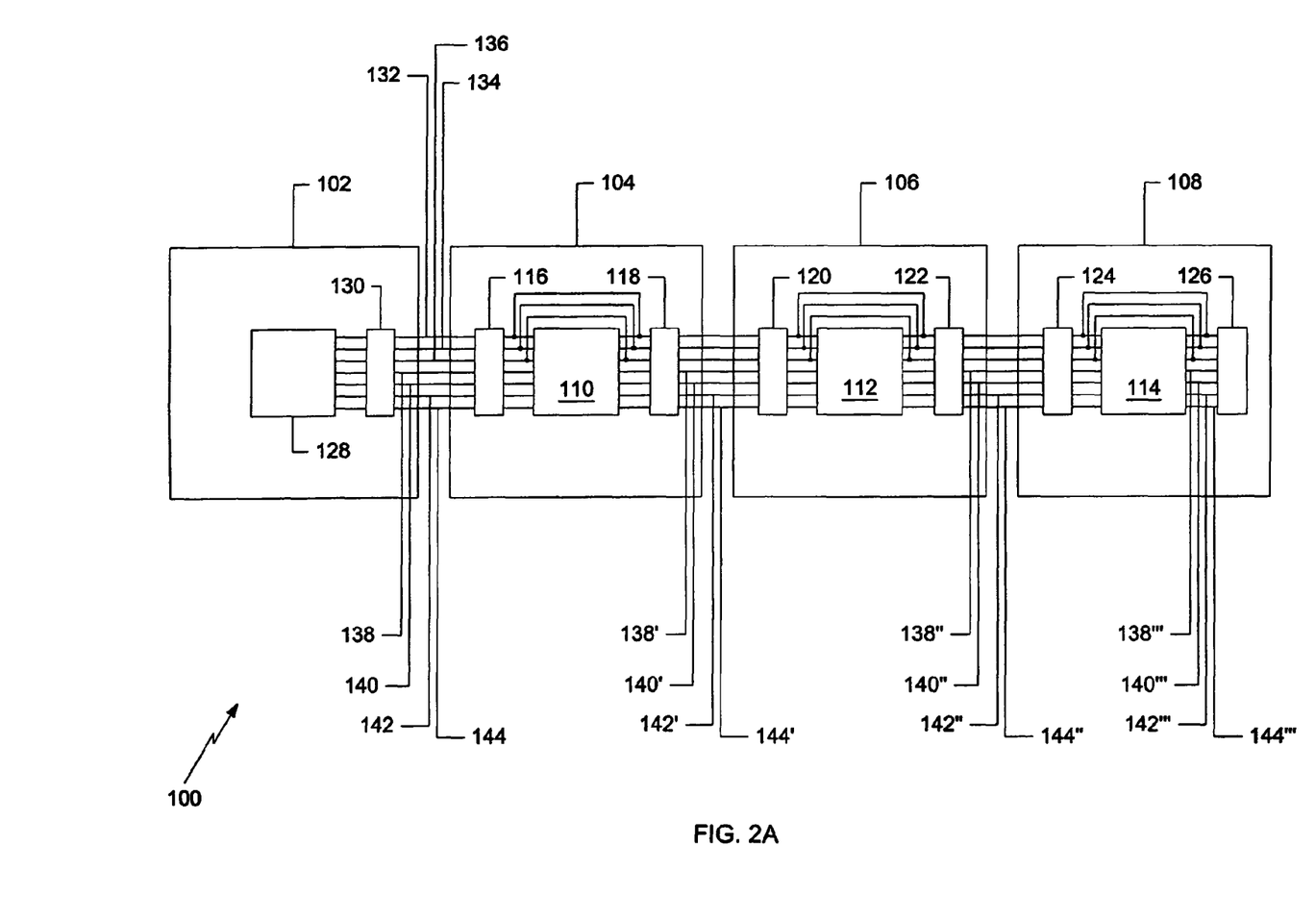
FIG. 2A depicts a more detailed view of a master/slave processing system, in accordance with one embodiment of the present invention.

FIG. 1 depicts a system 100 in accordance with the aforementioned generally described scheme. The system 100 includes a computer 102 in communication with a first unit of data communication equipment (a DCE unit) 104. The DCE unit 104 includes a processor (identified by reference numeral 110 in FIG. 2), which may be used for any application. One specific example of an application in which the processor may be used is within a CPU card, which may be in communication with other electronic equipment, such as a media converter card (not depicted) or an alarm card (not depicted). Together, a CPU card and other functional cards form a functional unit (such as 104) known as a chassis. Although the identification numbering scheme herein is described as useful in the context of a telecommunications rack including chassis having CPUs, one skilled in the art understands that the scheme disclosed herein may be used in any environment in which a first processor communicates with a plurality of other processors.

The computer 102 and the first DCE unit 104 are linked via communication ports, which are also referred to herein as input/output (I/O) ports. Although the figures and disclosure herein describe the automatic identification number assignment scheme as making use of serial communication ports, the scheme can be used with a system with any form of communication ports. The computer 102 transmits and receives signals via the port labeled "serial out," and the first DCE unit 104 receives signals from and transmits signals to the computer from the port labeled "serial in." The first DCE unit 104 also possesses a second communication port, labeled "serial out." As shown in FIG. 1, the system 100 includes two other DCE units 106 and 108, although the system 100 could include any number of DCE units, in principle. Each of the two other DCE units 106 and 108 also includes two serial communication ports, one labeled "serial in" and the other labeled "serial out." In each case, the port labeled "serial in" is used for communicating in an upstream direction (i.e., for communication in a direction toward the computer 102), while the port labeled "serial out" is used for communication in a downstream direction (i.e., for communication in a direction away from the computer 102). Thus, as shown in FIG. 1, the third DCE unit 108 is in communication with the second DCE unit 106; the second DCE unit 106 is in communication with the first DCE unit 104; the first DCE unit 104 is in communication with the computer 102.

As discussed in greater detail below, the direction of communication is significant when considering the ordinary use of various lines within the various serial ports. For example, if the serial communication ports are chosen to be RS-232 communication ports, then the communication ports will contain a particular number of independent communication lines, each of which is known to have a given purpose and use. Thus, handshaking and communication typically takes place according to a particular protocol, which is dependent upon whether the port is intended for use as a serial in port or a serial out port.

In the system 100 depicted in FIG. 1, the computer 102 is programmed to assume the role of a master processor, while the DCE units 104, 106 and 108 are programmed to assume the role of slave processors. The computer 102 may send commands to the DCE units 104, 106 and 108, which respond to the commands. For example, in the context of a telecommunications rack including various chassis populated with cards, the computer 102 may send a command to a particular CPU card in a particular chassis, asking the CPU card to identify its version number. The CPU card responds to the command, and returns its version number. In sum, the computer 102 generally transmits commands to the DCE units 104, 106, and 108, which receive the commands and respond thereto. The commands are transmitted via communication ports, wherein a plurality of DCE units are connected, one to another, with the first unit 104 being connected to the computer 102.

FIG. 2A depicts one embodiment of the generally described arrangement of FIG. 1 with more particularity. As in FIG. 1, the system 100 depicted in FIG. 2 depicts a computer 102 in communication with first, second, and third DCE units 104, 106, and 108. As is depicted in FIG. 2, each DCE unit 104, 106, and 108 includes a processor 110, 112, and 114, which is attached to first and second communication ports 116, 118, 120, 122, 124, and 126. The computer 102 also includes a processor 128 and a communication port 130. The computer 102 and DCE units 104, 106 and 108 are understood to possess memory devices (such as random access memory devices, read-only memory devices, flash memory devices, electrically programmable read-only memory devices, and electrically erasable programmable read-only memory devices) in data communication with the processors 110, 112, 114, and 128. The memory devices (not depicted) are used to store software/firmware instructions and data, which are used by the processors 110, 112, 114, and 128 during execution. Although FIG. 2 depicts the communication ports 116, 118, 120, 122, 124, 126, and 130 as being distinct from their respective processors 110, 112, 114, and 128, one skilled in the art understands that a communication port typically includes input/output circuitry on board the processor, as well as a physical connector into which a cable/plug combination is inserted.

The communication ports 116, 118, 120, 122, 124, 126, and 130 are depicted as each having seven lines. As stated above, in principle, the communication ports 116, 118, 120, 122, 124, 126, and 130 may be of any form (and may have any number of lines). For the purposes of illustration, the communication ports 116, 118, 120, 122, 124, 126, and 130 are presented as being RS-232 serial data ports. RS-232 ports generally include nine lines or twenty-five lines, but only seven lines are depicted for ease of illustration. Notably, lines 132, 134, and 136 are directly coupled from serial port to serial port in each DCE unit 104, 106, and 108. By "directly coupled," it is meant that each of lines 132, 134, and 136 includes a continuously conductive path between the point at which they enter a first I/O port (such as 116) and the point at which they exit a second I/O port (such as 118) on a given DCE unit. Alternatively, "directly coupled" may mean that a signal propagating along line 132 toward the first port 116 on the first DCE unit 104 also propagates to the first port 120 of the second DCE unit 106, and so on. Consequently, each of the DCE units 104, 106, and 108 effectively share each of these three lines 132, 134, and 136.

The shared lines 132, 134 and 136 are used for the transmission of commands from the computer 102 to the DCE units 104, 106 and 108, and for transmission of responses from the DCE units 104, 106, and 108 to the computer 102. Per the RS-232 protocol, line 132 may be used for transmission of serial data from the computer, while line 134 may be used for transmission of serial data to the computer. The signals that propagate along lines 132 and 134 are single-ended signals, which are measured against signal-ground, which is carried on line 136. Notably, the other four lines 138, 140, 142, and 144 are not directly coupled across communication ports on a DCE unit. Therefore, signals propagating along lines 138, 140, 142, or 144 toward the first port 116 on the first DCE unit 104 are not conducted to their counterpart lines 138', 140', 142', or 144' connected to the second communication port 118. Stated another way, line 138 is isolated from line 138', line 140 is isolated from line 140', and so on.

As a consequence of the above-described structure, transmissions of commands from the computer 102 are received by each of the processors 110, 112, and 114 in each of the DCE units 104, 106, and 108. Thus, as mentioned previously, each command must be associated with an identification number, so that each of the processors 110, 112, and 114 do not respond to every command.

Another consequence of the above-described structure is that the computer 102 and the first DCE unit 104 are connected by a set of lines 138, 140, 142, and 144 that are not shared by any other DCE unit. Additionally, the first and second DCE units 104 and 106 are connected by a set of lines 138', 140', 142', and 144' that are not shared by any other DCE unit or computer 102. In short, each DCE unit is coupled to another DCE unit by a set of private lines.

Per the RS-232 protocol, lines 138, 140, 142, and 144 are ordinarily used as input lines, from the vantage of the computer 102 (also referred to as a unit of data terminal equipment, DTE). In other words, the signals carried on lines 138, 140, 142, and 144 are usually generated by the first DCE unit 104 and received by the computer 102. RS-232 DTE input lines typically include a "data set ready" line (DSR line), a "clear to send" line (CTS line), a "data carrier detect" line (DCD line), and a "ring indicator" line (RI) line. Thus, for example, line 138 may be a DSR line, a line which is ordinarily used in a handshake sequence with a "data terminal ready" DTE output line (not depicted). Line 140 may be a DCD line, a line ordinarily used by a modem (DCE) to inform a computer (DTE) that it has detected a carrier signal generated by a modem on the other side of the telephone line. Line 142 may be a CTS line, a line ordinarily used by a printer or modem (or other DCE device) to indicate to the computer (DTE) whether data should continue to be transmitted to it. Finally, line 144 may be an RI line, a line ordinarily used by a modem (DCE) to indicate to the computer (DTE) that the telephone line is ringing. As described below, these lines are re-dedicated by the invention to other uses.

Figure 3A:
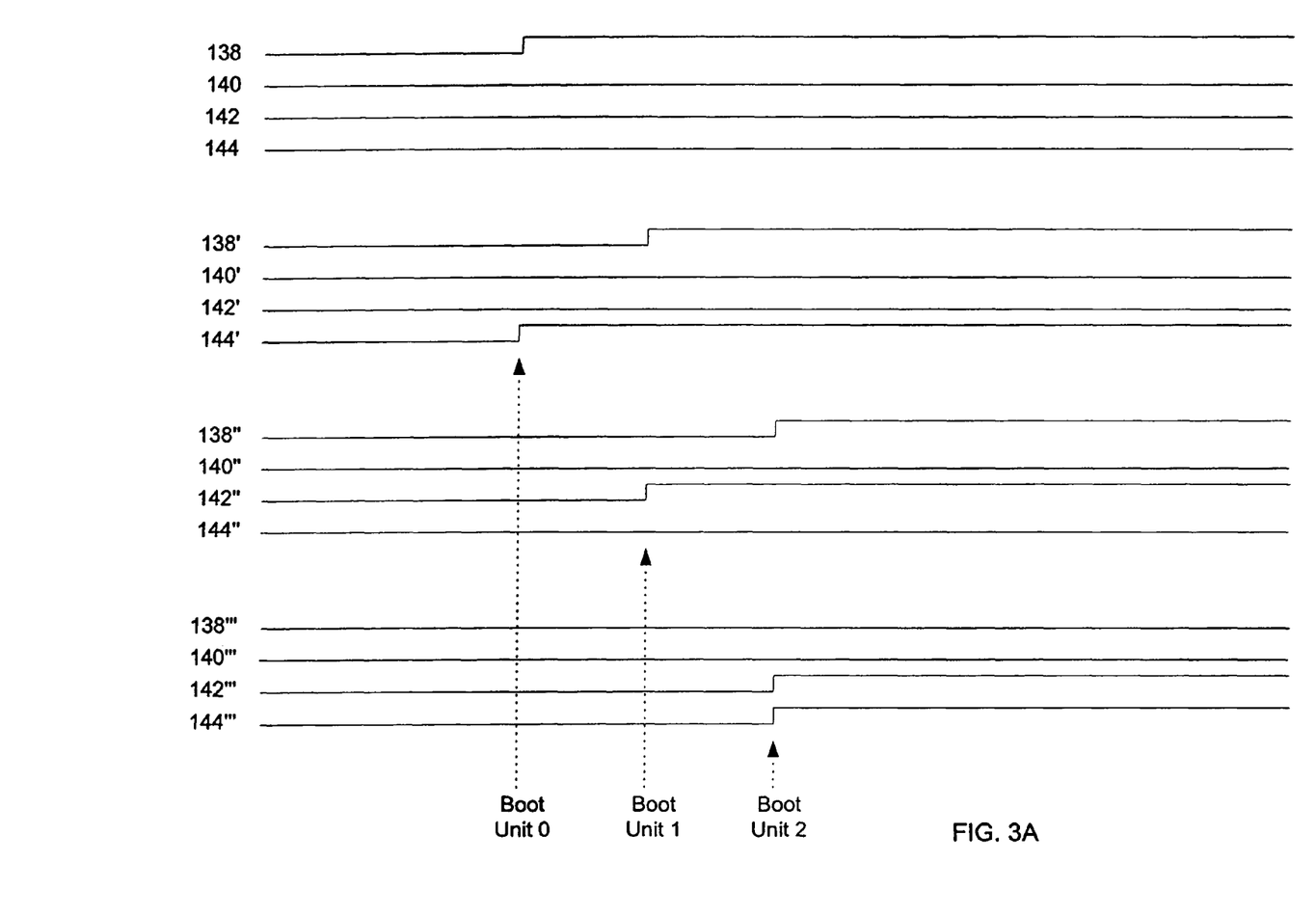
FIG. 3A depicts line levels plotted versus time, wherein each line is found in the system depicted in FIG. 2A.

FIG. 3A depicts signals held on lines 138, 140, 142, 144, 138', 140', 142', 144', 138", 140", 142", 144", 138''', 140''', 142''', and 144''' plotted against time (on the x axis), as those signals may appear per the embodiment depicted in FIG. 2A. As can be seen from FIG. 3A, lines 140, 142, and 144 remain always unasserted (the reason for assertion of line 138 is explained below). The reason for this is that the computer 102 expects to receive inputs on these lines 140, 142, and 144, and therefore does not, itself, attempt to assert any of these lines 140, 142, and 144.

Figure 4:
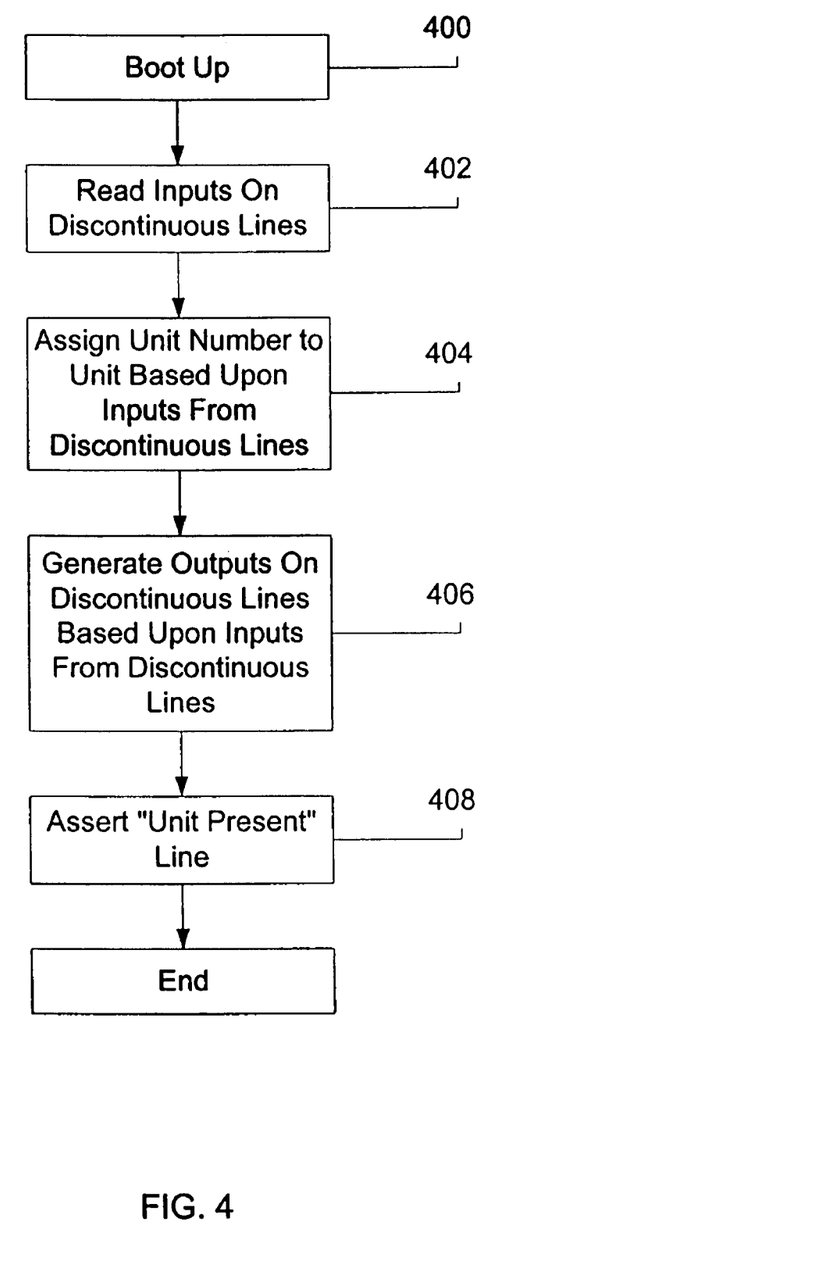
FIG. 4 depicts a set of operations enacted by a unit of data communication equipment, in accordance with one embodiment of the present invention.

The following discussion refers alternately to FIGS. 3A and 4A in order to clearly present one embodiment of the automatic identification number assignment scheme. FIG. 4A depicts a set of steps enacted by each DCE unit 104, 106, and 108 upon powering up. With reference to the first DCE unit 104, upon powering up, it executes its boot up routine at time t=0 (FIG. 3), as shown by operation 400. A boot up routine typically includes loading an operating system (or other necessary software) into a processor's main memory unit, such as a random access memory unit. If the DCE units 104, 106, and 108 do not utilize an operating system, the boot up step 400 refers to loading into main memory a set of instructions necessary for ordinary operation of the DCE unit (e.g., loading firmware into a main memory).

Thereafter, the first DCE unit 104 reads from its first communication port 116, as depicted in operation 402. The first DCE unit appends the values held on lines 140, 142 and 144 (the lines that privately connect the first DCE unit 104 to the computer 102) into a three-bit binary number. At time t=0, lines 140, 142, and 144 each contain low voltages, thereby corresponding to 0, 0, 0, respectively. Thus, the first DCE unit 104 appends these numbers together to form the three-digit binary number % 000 (wherein "%" indicates that "000" is to be regarded as binary). Next, as shown in operation 404, the first DCE unit 104 assigns itself an identification based upon the number % 000. According to one embodiment, the first DCE unit 104 simply assigns itself % 000 as its identification number. In one embodiment, the first DCE unit 104 (and the other DCE units, as well) is programmed to perform operation 404 only a single time after it is powered-up. By only performing the identification number assignment a single time, a DCE unit ensures that a power-down condition of an upstream DCE unit does not result in re-assignment of a new (and possibly redundant) identification number.

After assigning itself an identification number, the first DCE unit 104 generates an output on its second I/O port 118, as shown in operation 406. In one embodiment, the first DCE unit 104 increments by one the identification code it assigned to itself, and outputs this value on the lines shared privately by itself and the second DCE unit 106. Accordingly, the first DCE unit 104 increments % 000 by one and arrives at % 001. The number % 001 is then held on the lines 140', 142', and 144', as is shown in FIG. 3 (at time t=0, 140' is low, 142' is low, and 144' is high).

In one embodiment of the invention, the first DCE unit 104 asserts line 138 after booting up, as shown in operation 408. The purpose of asserting line 138 is to indicate the presence of the first DCE unit 104 to an upstream device (in this case, the computer 102). Thus, as can be seen in FIG. 3, line 138 rises from a low voltage to a high voltage at time t=0.

As can be seen from FIG. 3A, the boot up sequence for DCE units 104, 106, and 108 is staggered in time. The first DCE unit 104 is booted up at time t=0; the second DCE unit 106 is booted up at time t=1; the third DCE unit 108 is booted up at time t=2. Upon booting up, the second and third DCE units 106 and 108 also execute the above-described scheme. Consequently, at time t=1, the second DCE unit 106 observes that the value % 001 is held at its first I/O port 120, and therefore assigns itself % 001 as an identification code. Thereafter, the second DCE unit 106 increments % 001 by one, and outputs the result (% 010) at its second I/O port 122. Optionally, the second DCE unit 106 may assert line 138' to indicate its presence to the first DCE unit 104. At time t=2, the third DCE unit 108 boots up. The third DCE unit 108 then observes that the value % 010 is held at its first I/O port 124, and therefore assigns itself % 010 as an identification code. Thereafter, the third DCE unit 108 increments % 010 by one, and outputs the result (% 011) at its second I/O port 126. Optionally, the third DCE unit 108 may assert line 138" to indicate its presence to the second DCE unit 104.

As described above, the net consequence of each DCE unit 104, 106, and 108 executing the steps depicted in FIG. 4A is that each DCE unit 104, 106 and 108 assigns itself a unique identification code, and that each DCE unit 104, 106, and 108 announces its presence to an upstream device.

Figure 2B:
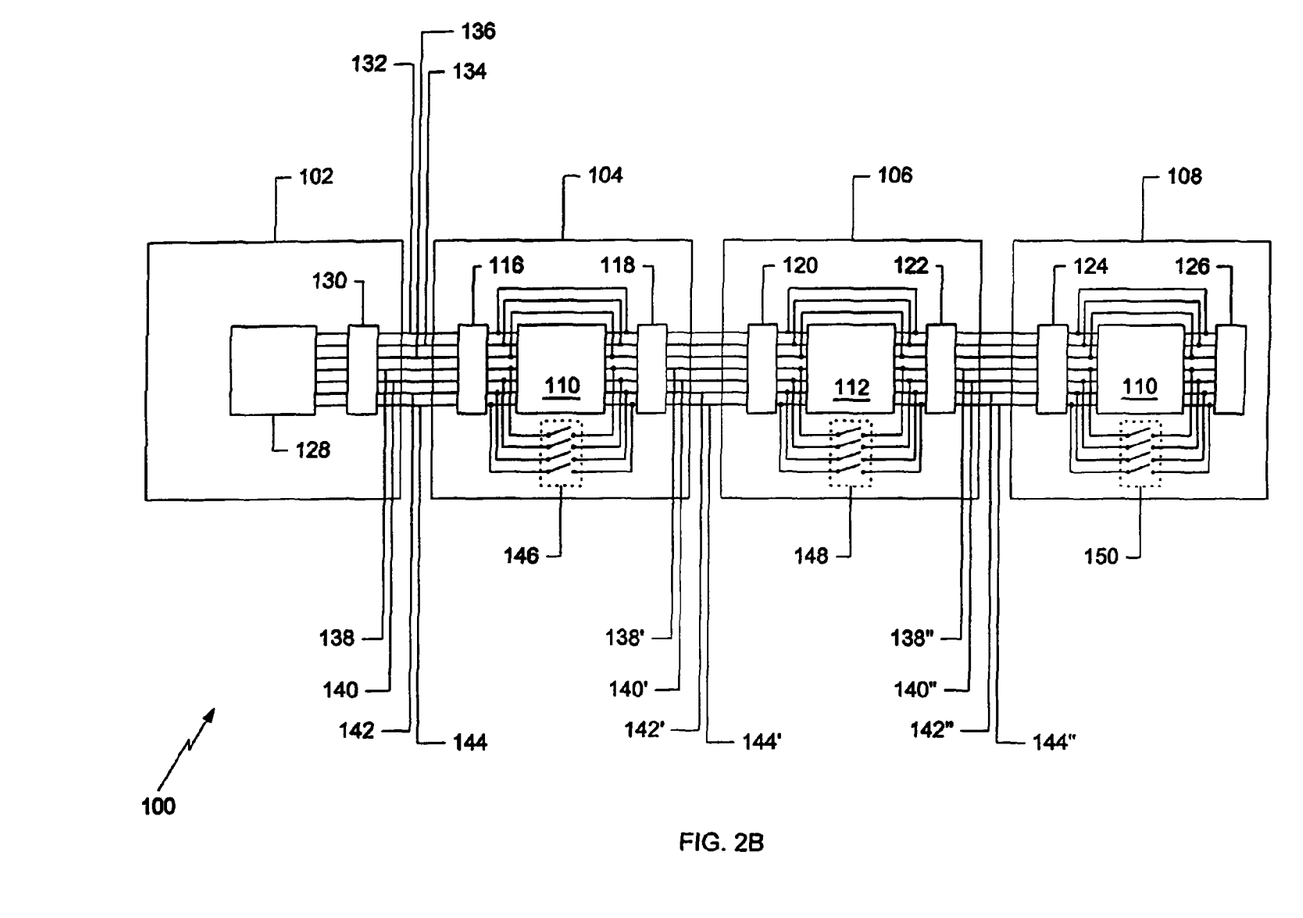
FIG. 2B depicts a more detailed view of another master/slave processing system, in accordance with one embodiment of the present invention.

FIG. 2B depicts another embodiment of the present invention. The embodiment of FIG. 2B is identical to the embodiment of FIG. 2A, with the exception of the inclusion of bypass switches 146, 148, and 150. The bypass switches 146, 148, and 150 are connected between each of the unlinked lines of the first I/O port 116, 120, and 124 and the second I/O port 118, 122, and 126 in each DCE unit 104, 106 and 108. The bypass switches 146, 148, and 150 are controlled so as to be open when their respective processors 110, 112, and 114 are powered on, and to be closed when their respective processors 110, 112, and 114 are powered down. Each bypass switch 146, 148, and 150 could be a relay or transistor arranged to detect current drawn by its associated processor 110, 112, and 114. Without the presence of the bypass switches 146, 148, and 150, signals emanating from an upstream processor (relative to a powered-down processor) would not be received by a downstream processor (again, relative to a powered-down processor). The effect of closing each of the bypass switches 146, 148, and 150 in response to a processor powering-down is that signals emanating from an upstream processor (relative to the powered-down processor) are passed along to a downstream processor (relative to the powered-down processor). The discussion associated with FIG. 3B discloses the bypass effect with more particularity.

Figure 3B:
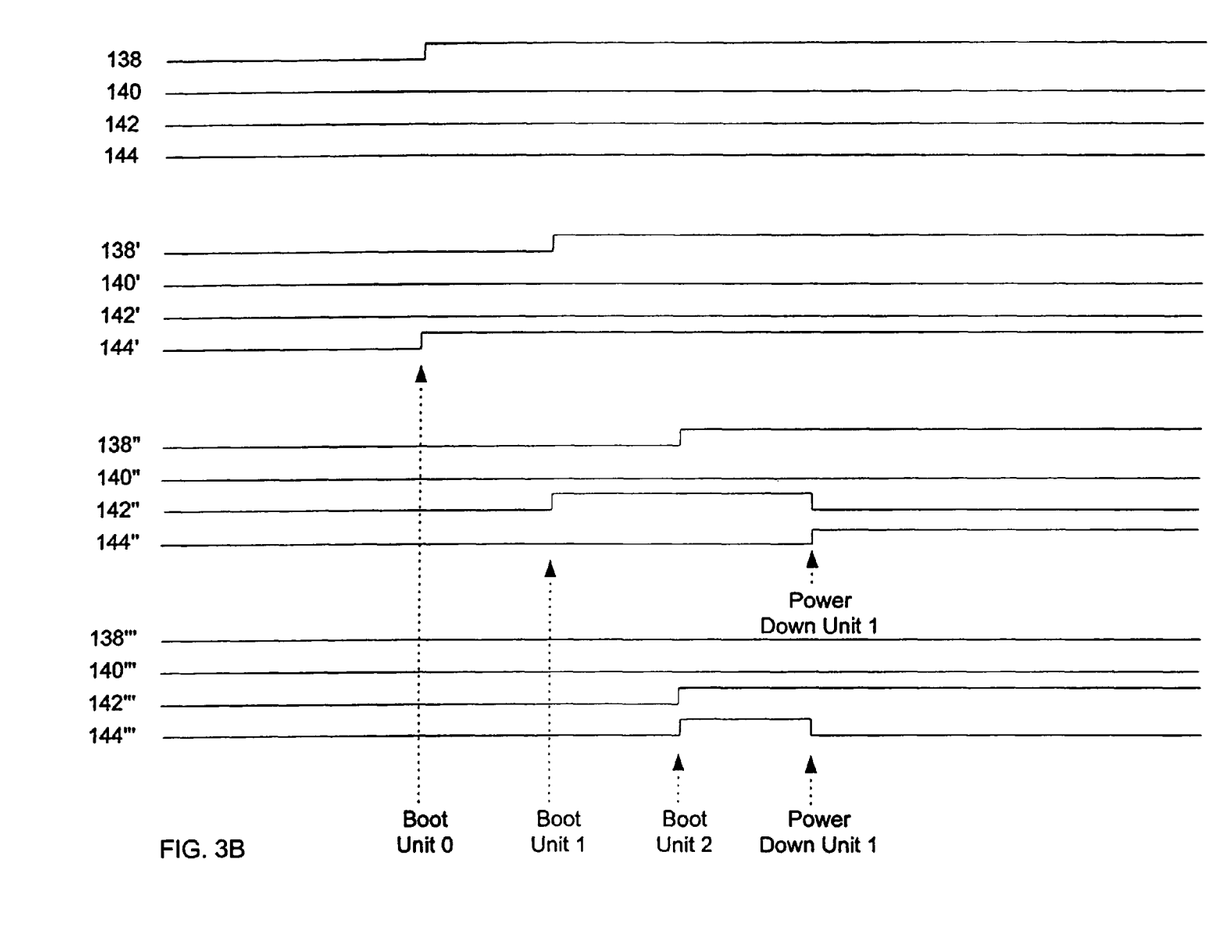
FIG. 3B depicts line levels plotted versus time, wherein each line is found in the system depicted in FIG. 2B.

FIG. 3B depicts signals held on lines 138, 140, 142, 144, 138', 140', 142', 144', 138", 140", 142", 144", 138''', 140''', 142''', and 144''' plotted against time, as those signals may appear per the embodiment depicted in FIG. 2B (i.e., per the embodiment with bypass switches 146, 148, and 150). The depiction of FIG. 3B is similar to the depiction of FIG. 3A, in that the first DCE unit 104 is initially booted up, followed by the second DCE unit 106, and finally by the third DCE unit 108. The signals resulting from each of these events are identical to those shown in FIG. 3A. The chart of FIG. 3B varies from the chart of FIG. 3A at the point in time (on the x axis) labeled "Power Down Unit 1." At this point in time, the second DCE unit 106 is powered down (either intentionally or unintentionally).

In the wake of DCE unit 106 being powered down, its set of associated bypass switches 148 close. Consequently, the signals held on lines 138', 140', 142' and 144' are coupled to lines 138", 140", 142" and 144", respectively. This effect can be observed on lines 142" and 144" (in FIG. 3B) at the point in time labeled "Power Down Unit 1." At that point in time, the voltage carried on line 142" drops (thereby matching the voltage carried on line 142'), while the voltage on line 144" rises (thereby matching the voltage carried on line 144'). Thus, at the point in time at which DCE unit 106 powered down, DCE unit 108 receives % 001 at its first I/O port 124 (i.e., the same input that DCE unit 106 had been receiving at its first I/O port 120). As a result, DCE unit 108 changes its identification code from % 010 to % 001 (i.e., it assigns itself the identification code previously held by DCE unit 106). DCE unit 108 outputs % 010 at its second output port 126, as can be seen from FIG. 3B. If a fourth DCE unit were connected to the second I/O port 126, it would change the identification number assigned to itself (this change would occur due to the output at I/O port 126 changing from % 011 to % 010 when DCE unit 106 powered down).

In summary, the inclusion of bypass switches 146, 148 and 150 permits each DCE unit 104, 106 and 108 to assign itself a unique identification number, regardless of whether each upstream DCE unit is powered up or not. Further, the inclusion of the bypass switches 146, 148, and 150 eliminates the need for the DCE units to be powered up in sequence.

In the wake of each DCE unit 104, 106, and 108 having assigned itself a unique identification code, the computer 102 may command each DCE unit 104, 106, and 108 individually by associating an identification number with a command. For example, by associating identification number % 001 with a command, the second DCE unit 106 responds, while the first and third DCE units 104 and 108 dismiss the command.

Figure 5:
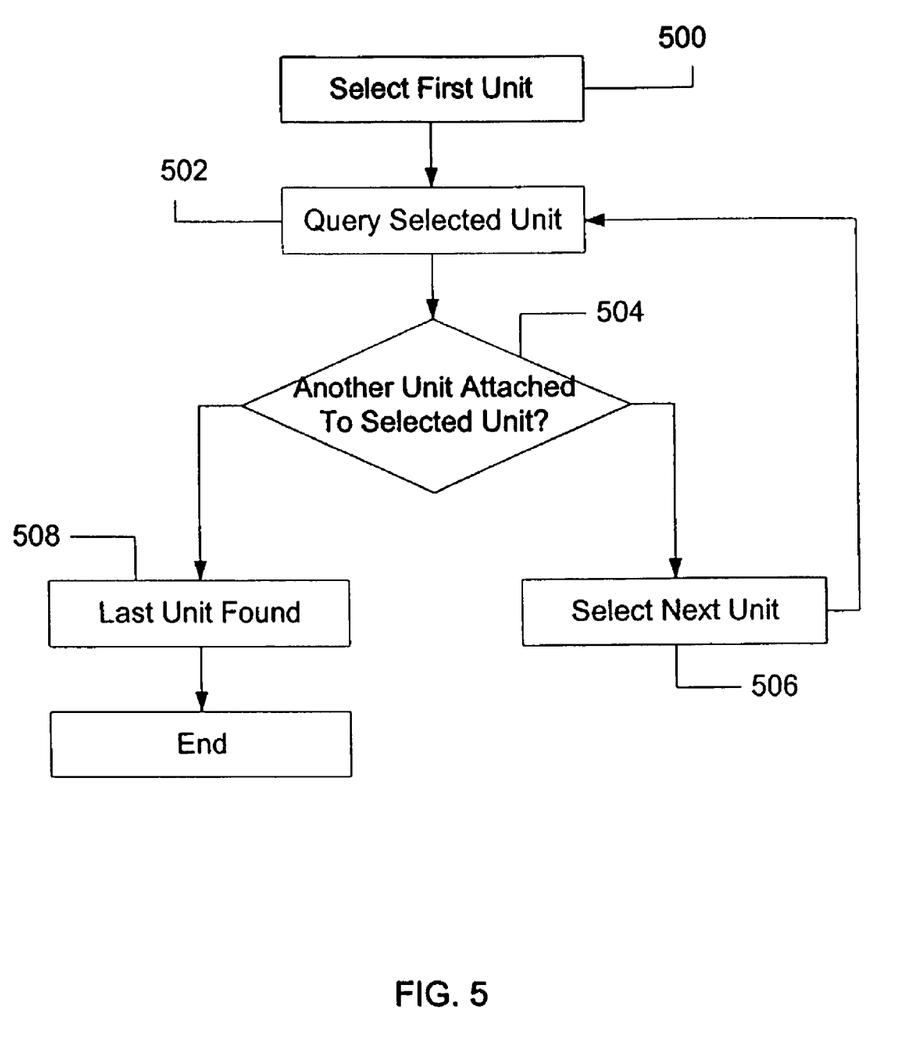
FIG. 5 depicts a scheme by which a master processor may determine the presence or absence of slave processors.

In order for the computer 102 to transmit a command to a particular DCE unit 104, 106, or 108, the computer 102 must be informed of the presence of the particular DCE unit 104, 106, or 108. The scheme depicted in FIG. 5 is one manner in which a master processor 102 may be made aware of the presence or absence of each DCE unit 104, 106, or 108. The method of FIG. 5 may function best in the context of a system including bypass switches 146, 148 and 150. Initially, as shown in operation 500, the computer 102 selects the first DCE unit 104, 106, or 108, typically meaning that it selects the unit that has identified itself identification number % 000. Thereafter, it sends a query command to the selected DCE unit 104, 106, or 108, as shown in operation 502. For example, the computer 102 may transmit a command that literally reads "query 000." One skilled in the art will recognize that any command frame that associates a query command with an identification number is sufficient. In response, the DCE unit 104 that has assigned itself identification number % 000 responds as follows (all other DCE units 106 and 108 ignore the command). The queried DCE unit 104 responds by examining its second I/O port to determine if line 138 is asserted (the assertion of line 138 indicates the presence of the second DCE unit 106), as shown in operation 504. The DCE unit responds, indicating whether or not line 138 is asserted. If line 138 is asserted, the computer 102 selects the next DCE unit (e.g., DCE unit 104, with identification number % 001), as shown in operation 506. Thereafter, control returns to operation 502 wherein the computer transmits a query command to the newly selected DCE unit 104. Thus, operations 502, 504, and 506 cooperate to form a loop in which each DCE unit 104, 106, or 108 is asked to indicated whether or another DCE unit is attached to it. The querying typically occurs beginning with the DCE unit 104 closest to the computer 102, and proceeds downstream until the final DCE unit 108 is reached. When a DCE unit finally responds that no other DCE unit is attached to it, the computer 102 draws the inference that it has found the last DCE unit in the chain, as indicated by operation 508.

Figure 6A:
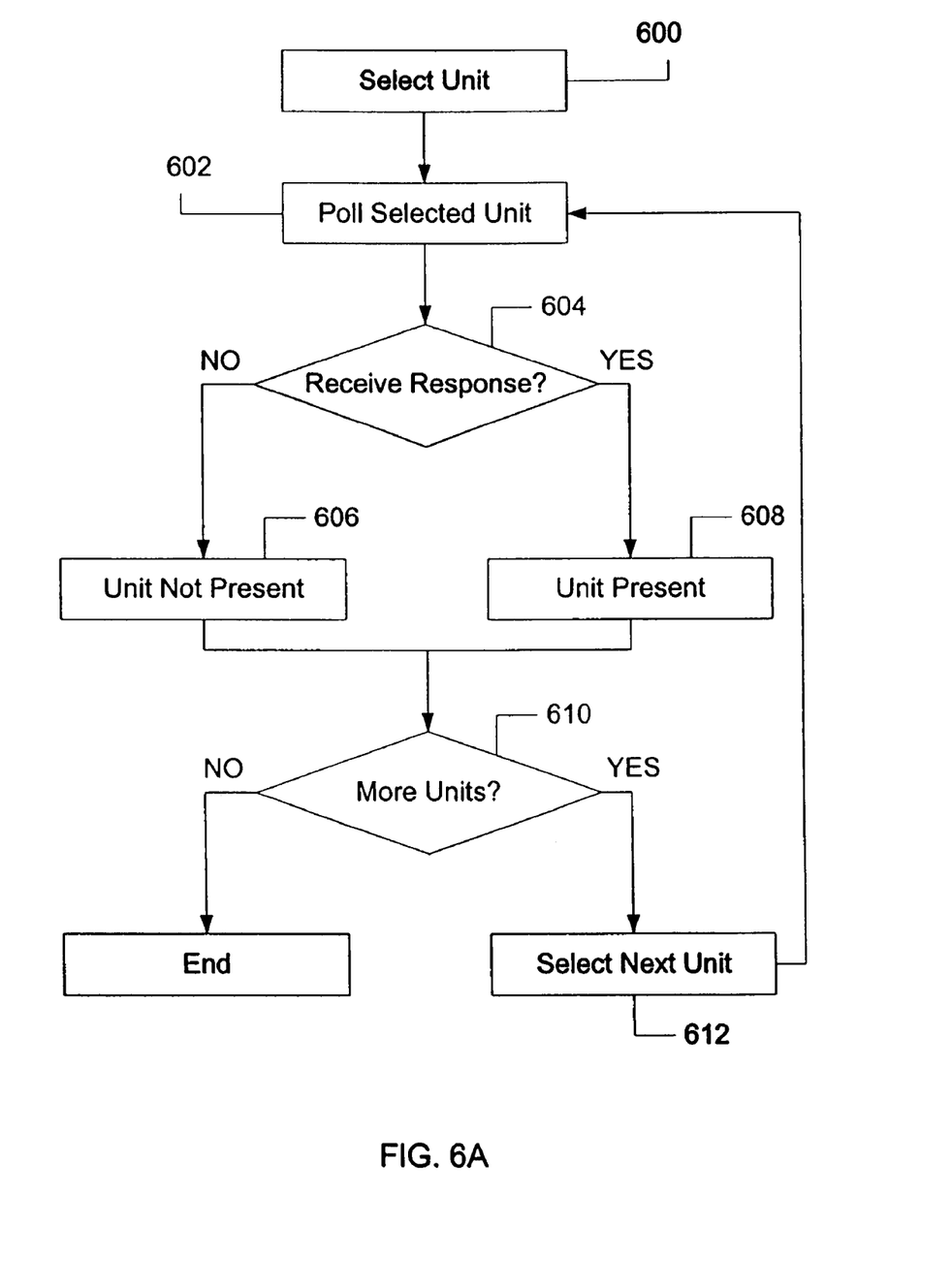
FIG. 6A depicts another scheme by which a master processor may determine the presence or absence of slave processors.

FIG. 6A depicts another manner by which a master processor 102 may be made aware of the presence or absence of each DCE unit 104, 106, or 108. The method of FIG. 6B may function best in the context of a system lacking bypass switches 146, 148 and 150. Initially, as shown in operation 600, the computer 102 selects the first DCE unit 104, 106, or 108, typically meaning that it selects the unit that has identified itself identification number % 000. Thereafter, it sends a poll command to the selected DCE unit 104, as shown in operation 602. For example, the computer 102 may transmit a command that literally reads "poll 000." One skilled in the art will recognize that any command frame that associates a poll command with an identification number is sufficient. In response, if there exists a DCE unit that has assigned itself the selected identification number, such a DCE unit responds, thereby acknowledging its existence. All other DCE units ignore the poll command.

After transmission of the poll command, the computer 102 waits for a designated period for a response, as shown in operation 604. If no response is received, the computer 102 records in memory that no DCE unit is presently using the selected identification number, as shown in operation 606. Alternatively, if a response is received, the computer records in memory that a DCE unit is using the selected identification number, as shown in operation 608.

After recording the absence or presence of a particular DCE unit, the computer determines whether or not it has polled all possible units, as shown in operation 610. For example, the system depicted in FIG. 2 uses three lines (140, 142, and 144) for communication of identification numbers. Consequently, only eight possible unique identification numbers are possible. Thus, in operation 610, the computer determines whether all eight possibilities have been polled. If so, the method ends, as depicted by operation 614. If not, the computer 102 selects the next identification number (e.g. % 001) for polling, as shown in operation 612. Thereafter, control returns to operation 602, where the selected identification number is associated with a poll command. Operations 602, 604, 606, 608, 610, and 612 cooperate to form a loop in which each DCE unit is polled; if a particular DCE unit responds, its presence is recorded, otherwise its absence is recorded.

Figure 6B:
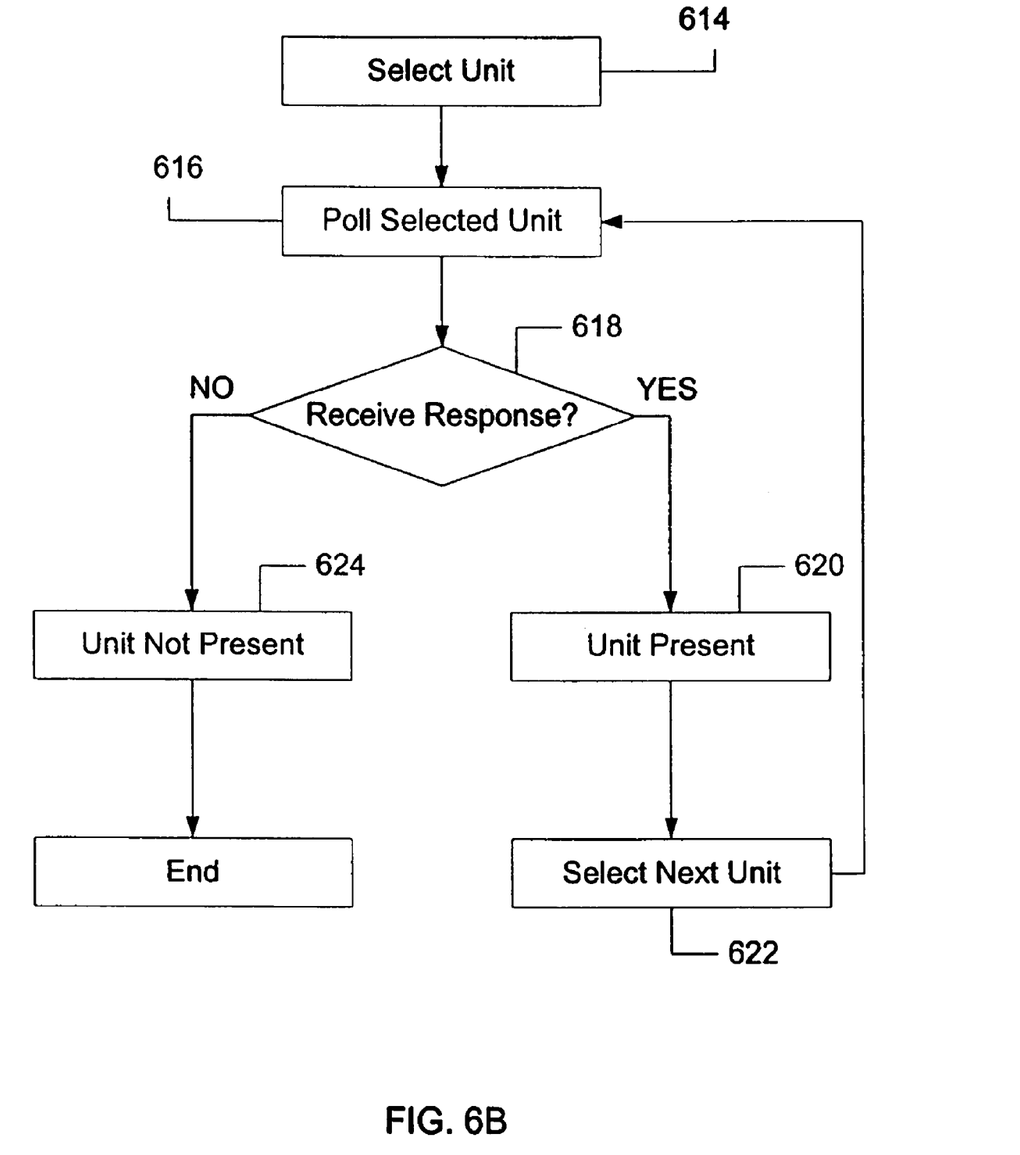
FIG. 6B depicts yet another scheme by which a master processor may determine the presence or absence of slave processors.

FIG. 6B depicts yet another manner by which a master processor 102 may be made aware of the presence or absence of each DCE unit 104, 106, or 108. The method of FIG. 6B may function best in the context of a system including bypass switches 146, 148 and 150. Initially, as shown in operation 614, the computer 102 selects the first DCE unit 104, 106, or 108, typically meaning that it selects the unit that has identified itself identification number % 000. Thereafter, it sends a poll command to the selected DCE unit 104, as shown in operation 616. In response, if there exists a DCE unit that has assigned itself the selected identification number, such a DCE unit responds, thereby acknowledging its existence. All other DCE units ignore the poll command.

After transmission of the poll command, the computer 102 waits for a designated period for a response, as shown in operation 618. If no response is received, the computer 102 records in memory that no DCE unit is presently using the selected identification number, as shown in operation 624, and the process ends. Alternatively, if a response is received, the computer records in memory that a DCE unit is using the selected identification number, as shown in operation 620. Thereafter, the next DCE unit is selected for polling (DCE unit % 001 is selected for polling after % 000), and control is returned to operation 616.

The methods depicted in FIGS. 5, 6A, and 6B may be executed periodically, so that the computer may be updated from time to time regarding the status of each DCE unit 104, 106, and 108.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the although the present invention is described with reference to serial communication data ports, the present invention could make use of any form of communication data port, including parallel communication data ports. Additionally, the scheme described herein is susceptible of deployment in any form of system in which one processor is to communicate with a plurality of processors, even if the relationship between the processors is not master/slave. Numerous other changes may be made which will readily suggest themselves to those skilled in the art and which are encompassed in the spirit of the invention disclosed and as defined in the appended claims.

The invention claimed is:

1. A computerized system that automatically assigns an identification code to each of a plurality of slave processors in communication with a master processor, the system comprising:
    a master processor; and
    a plurality of slave processors communicatively connected to the master processor and to each other by a plurality of common signal lines, each of the common signal lines directly linking the master processor to each of the plurality of slave processors, and each of the plurality of slave processors to each other;
    wherein the plurality of slave processors are serially connected by a plurality of private signal lines, the private signal lines including first private signal lines directly linking adjacent first and second slave processors to each other and not directly coupled to the master processor, and second private signal lines directly linking the first slave processor to the master processor and not directly coupled to the second slave processor;
    wherein the first slave processor of the plurality of slave processors is programmed to assign itself an identification code based upon the digital signal held on first private signal lines communicatively connected between the first slave processor and the master processor, and thereafter respond to commands on the common signal lines only if the commands are associated with the identification code the first slave processor assigned itself.

2. The system of claim 1, wherein the common signal lines are linked signal lines.

3. The system of claim 1, wherein the first slave processor is programmed to assign itself an identification code equal to the digital signal held on the private signal lines.

4. The system of claim 1, wherein the first slave processor is programmed to generate a digital signal on second private signal lines connected between the first slave processor and a second slave processor of the plurality of slave processors by incrementing by one the digital signal on the first private signal lines.

5. The system of claim 4, wherein the second slave processor indicates its presence by asserting one of the second private signal lines.

6. The system of claim 4, wherein the first slave processor indicates its presence by asserting one of the first private signal lines.

7. The system of claim 5, wherein the first slave microprocessor is programmed to:
    receive from the master processor a query command associated with the identification code the first slave processor assigned to itself, and in response thereto determine whether the line to be asserted by the second slave processor to indicate the second slave processor's presence is in fact asserted;
    in the case that the line to be asserted by the second slave processor is asserted, report to the master processor that the second slave processor is present; and
    in the case that the line to be asserted by the second slave processor is not asserted, report that the second slave processor is not present.

8. The system of claim 7, wherein the master processor is programmed to repetitively query the first slave processor to determine whether or not the second slave processor is present.

9. The system of claim 1, wherein the master processor is programmed to poll each slave processor, and if after a period of time elapses with no response from the polled slave processor, to conclude that the polled slave processor is not present.

10. The system of claim 1, wherein the common signal lines are signal ground, transmit data, and receive data.

11. The system of claim 1, wherein the private signal lines are selected from the set consisting of data set ready, data carrier detect, clear to send, and ring indicator.

12. A method of automatically assigning an identification code to each of a plurality of slave processors in communication with a master processor, the method comprising:
    receiving with a first slave processor a signal carried on first private signal lines directly connecting the first slave processor and a master processor;
    assigning the first slave processor a first identification code based upon the signal held on the first private signal lines connecting the first slave processor and the master processor;
    generating a second identification code for a second slave processor directly connected to the first slave processor by second private signal lines, the second private signal lines not directly coupled to the master processor and the first private signal lines not directly coupled to the second slave processor; and
    transmitting the second identification code to the second slave processor on the second private signal lines;
    wherein the master processor, the first slave processor, and the second slave processor are communicatively connected by a plurality of common signal lines, the common signal lines each directly linking the master processor to the first slave processor and the second slave processor and the first slave processor and the second slave processor to each other;
    wherein the first slave processor thereafter responds to commands from the master processor on the common lines only if the commands are associated with the first identification code.

13. The method of claim 12, further comprising assigning the second slave processor a second identification code based upon the signal held on the second private signal lines connecting the second slave processor and the first slave processor.

14. The method of claim 13, wherein the second slave processor thereafter responds to commands on the common signal lines only if the commands are associated with the second identification code.

15. The method of claim 12, further comprising:
    receiving a query command from the master processor at the first slave processor on the common signal lines, the query command associated with the first identification code;
    determining the presence of a second slave processor;
    responding to the query command.

16. The method of claim 15, wherein determining the presence of a second slave processor comprises determining whether a line to be asserted by the second slave processor is in fact asserted.

17. The method of claim 16, wherein responding to the query command comprises, in the case that the line to be asserted by the second slave processor is asserted, reporting to the master processor that the second slave processor is present.

18. The method of claim 16, wherein responding to the query command comprises, in the case that the line to be asserted by the second slave processor is not asserted, reporting to the master processor that the second slave processor is not present.

19. The method of claim 12, further comprising storing in a memory associated with the first slave processor a set of instructions for assigning the first slave processor a first identification code at a designated point in time after power-up.

20. The method of claim 19, further comprising, as long as the processor remains powered-up, refraining from assigning the first slave processor a different identification code.

21. A computerized system that automatically assigns an identification code to each of a plurality of slave processors in communication with a master processor, the system comprising:

a master processor coupled to an input/output (I/O) port;

a first slave processor coupled to first and second I/O ports, the first I/O port connected to the I/O port coupled to the master processor using first private signal lines and common signal lines;

a second slave processor coupled to first and second I/O ports, the first I/O port of the second slave processor connected to the second I/O port of the first slave processor using second private signal lines and common signal lines, the second private signal lines not directly coupled to the master processor and the first private signal lines not directly coupled to the second slave processor; and     means for automatically and uniquely assigning an identification number to each of the first and second slave processors;

wherein each of the first and second slave processors are configured to respond to commands received on the common lines of at least one of the first and second I/O ports only if the commands are associated with the identification number assigned to that first or second slave processor, wherein the common lines each directly link the master processor to both the first slave processor and the second slave processor, and the first slave processor and the second slave processor to each other.

\* \* \* \* \*